United States Patent
Dell'Endice et al.

(10) Patent No.: US 10,124,959 B2
(45) Date of Patent: Nov. 13, 2018

(54) TRANSPORT APPARATUS WITH VACUUM BELT

(71) Applicant: QualySense AG, Glattbrugg (CH)

(72) Inventors: Francesco Dell'Endice, Zurich (CH); Paolo D'Alcini, Zurich (CH)

(73) Assignee: QualySense AG, Glattbrugg (CH)

( * ) Notice: Subject to any disclaimer, the term of this patent is extended or adjusted under 35 U.S.C. 154(b) by 0 days.

(21) Appl. No.: 15/322,975

(22) PCT Filed: Jun. 17, 2015

(86) PCT No.: PCT/EP2015/063616
§ 371 (c)(1),
(2) Date: Dec. 29, 2016

(87) PCT Pub. No.: WO2016/000967
PCT Pub. Date: Jan. 7, 2016

(65) Prior Publication Data
US 2017/0137227 A1   May 18, 2017

(30) Foreign Application Priority Data
Jun. 30, 2014   (CH) .................................. 00990/14

(51) Int. Cl.
*B07C 5/34* (2006.01)
*B65G 21/20* (2006.01)
(Continued)

(52) U.S. Cl.
CPC .......... *B65G 21/2036* (2013.01); *B07C 5/363* (2013.01); *B65G 21/22* (2013.01); *B65G 47/1485* (2013.01)

(58) Field of Classification Search
CPC ............ B65G 21/2027; B65G 21/2036; B65G 47/1485; B65G 59/04; B07C 5/34; B07C 5/342; B07C 5/362
See application file for complete search history.

(56) References Cited

U.S. PATENT DOCUMENTS 3,131,929 A   5/1964   Rehm
3,363,783 A   1/1968   Rehm
(Continued)

FOREIGN PATENT DOCUMENTS

CN   102215805 A   10/2011
CN   103501924 A   1/2014
(Continued)

OTHER PUBLICATIONS

International Search Report of PCT/EP2015/063616, dated Nov. 30, 2015. [PCT/ISA/210].
(Continued)

*Primary Examiner* — Jospeh C Rodriguez
(74) *Attorney, Agent, or Firm* — Sughrue Mion, PLLC

(57) ABSTRACT

A transport apparatus comprises an endless vacuum conveyor belt (310) having a plurality of perforations (311). The conveyor belt transports the particles along a transport direction (T) while they are aspirated to the perforations, thereby defining a moving transport surface (316). The transport surface extends in an essentially vertical plane (x-z), and the transport direction (T) is inclined upwardly relative to the horizontal direction (x). An inclined recycling tray (200) recycles particles that have fallen from the conveyor belt back to a feeding zone (150) purely by the action of gravity. A separating wall (600) separates a processing zone from a clean zone of the apparatus. The conveyor belt interacts with an elongate vacuum box, which is open along one side, the open side being covered by an elongate slider. The slider has suction openings with a cross section that varies along the transport direction (T).

15 Claims, 9 Drawing Sheets

(51) Int. Cl.
*B65G 21/22* (2006.01)
*B65G 47/14* (2006.01)
*B07C 5/36* (2006.01)

(56) References Cited

U.S. PATENT DOCUMENTS

| | | | | |
|---|---|---|---|---|
| 3,649,002 | A * | 3/1972 | Burkhardt | B07C 1/04 |
| | | | | 271/12 |
| 3,770,112 | A * | 11/1973 | Asfour | A24B 3/16 |
| | | | | 131/312 |
| 3,939,983 | A * | 2/1976 | Asfour | A24B 1/04 |
| | | | | 209/581 |
| 4,609,108 | A * | 9/1986 | Hristozov | A24B 1/04 |
| | | | | 198/453 |
| 5,219,093 | A | 6/1993 | Moulding, Jr. et al. | |
| 5,524,746 | A * | 6/1996 | Massen | B07C 5/3425 |
| | | | | 198/443 |
| 5,768,996 | A * | 6/1998 | Ackley | A61J 3/007 |
| | | | | 101/35 |
| 7,800,009 | B2 * | 9/2010 | Gochar, Jr. | B07C 5/3422 |
| | | | | 209/576 |
| 8,072,590 | B2 * | 12/2011 | Ackley, Jr. | B23K 26/0838 |
| | | | | 209/580 |
| 8,764,183 | B2 * | 7/2014 | Schaeffer | B41J 3/28 |
| | | | | 347/101 |
| 8,907,241 | B2 * | 12/2014 | Dell'Endice | B07C 5/02 |
| | | | | 209/576 |
| 8,910,798 | B2 * | 12/2014 | Benjamins | B07B 13/003 |
| | | | | 209/643 |
| 9,757,772 | B2 * | 9/2017 | Ackley | B07C 5/3422 |
| 2005/0211256 | A1 * | 9/2005 | Funke | A24B 1/04 |
| | | | | 131/109.2 |

FOREIGN PATENT DOCUMENTS

| | | |
|---|---|---|
| DE | 19 33 320 A1 | 1/1971 |
| DE | 297 18 612 U1 | 3/1998 |
| DE | 100 26 331 A1 | 2/2002 |
| EP | 2 077 243 A1 | 7/2009 |
| FR | 2 099 498 A1 | 3/1972 |
| GB | 2 200 885 A | 8/1988 |
| WO | 2012/145850 A1 | 11/2012 |

OTHER PUBLICATIONS

Written Opinion of PCT/EP2015/063616, dated Nov. 30, 2015. [PCT/ISA/237].

Communication dated May 11, 2018 from the European Patent Office in counterpart European application No. 15729845.6.

Machine Translation of Chinese communication dated Apr. 12, 2018 in application No. 201580034696.2.

* cited by examiner

TRANSPORT APPARATUS WITH VACUUM BELT

CROSS REFERENCE TO RELATED APPLICATIONS

This application is a National Stage of International Application No. PCT/EP2015/063616 filed Jun. 17, 2015, claiming priority based on Swiss Patent Application No. 00990/14 filed Jun. 30, 2014, the contents of all of which are incorporated herein by reference in their entirety.

TECHNICAL FIELD

The present invention relates to an apparatus for transporting particles. The apparatus comprises a vacuum conveyor belt, i.e., a conveyor belt that has a plurality of holes (perforations) to which a negative pressure can be applied. The apparatus can conveniently be employed for sorting the particles into quality classes.

PRIOR ART

WO 2012/145850 A1 discloses a sorting apparatus for sorting particles, e.g. grains or seeds, into two or more quality classes. The apparatus comprises a measurement device for determining at least one analytical property of said particles, said measurement device including a light source for illuminating the particles and a spectrometer for analyzing spectral properties of the particles. A sorting device is operatively coupled to the measurement device and sorts the particles into the quality classes based on the analytical property. A transport device transports the particles past the measurement device and to the sorting device. The transport device comprises a vacuum conveyor belt, i.e., an endless perforated conveyor belt, which has a plurality of perforations, a vacuum pump applying a negative pressure to the perforations. The vacuum causes particles that are fed to the transport device to be aspirated to the perforations and to be transported on the conveyor belt past the measurement device to the sorting device. The surface of the conveyor belt on which the particles are transported (the "transport surface") points downward, i.e., the particles are transported "overhead", being suspended from the conveyor belt rather than lying on top of the conveyor belt.

Feeding the particles to the vacuum conveyor belt is accomplished by employing a feeding belt, which receives the particles from a hopper and accelerates the particles towards the vacuum conveyor belt so as to facilitate aspiration of the particles to the perforations of the conveyor belt. A recirculation duct receives particles that have not been aspirated to the perforations. From there, the particles are recycled to the hopper by means of a pump.

A disadvantage of such a prior-art apparatus can be seen in the complexity of the feeding and recycling systems, which leads to increased manufacturing and service costs. A further disadvantage of this prior-art design is that the drive components of the transport device and delicate components of the measurement device are exposed to the dust that inevitably accompanies particles of natural origin, such as grains or seeds.

SUMMARY OF THE INVENTION

In a first aspect of the present invention, it is an object of the present invention to provide a transport apparatus with a vacuum conveyor belt that enables simplified feeding, recycling and better protection of selected components of the apparatus from dust.

According to the first aspect, the present invention provides an apparatus for transporting particles, the apparatus comprising:
  an endless conveyor belt having a plurality of perforations along its length, the apparatus being configured to enable application of a negative pressure to said perforations so as to aspirate the particles to said perforations, the conveyor belt being configured to transport the particles along a transport direction while they are aspirated to said perforations, thereby defining a movable transport surface; and
  a feeding device for feeding the particles to the conveyor belt in a feeding zone,
    wherein the transport surface extends in an essentially vertical plane, and
    wherein the transport direction is inclined upwardly relative to a horizontal direction.

The apparatus may further comprise a source of negative pressure, in particular, a vacuum pump, for applying a negative pressure to the perforations of the conveyor belt. For driving the conveyor belt so as to transport the particles along the transport direction, the apparatus may comprise a drive motor, e.g., an electrical or pneumatic motor.

According to the invention, the portion of the conveyor belt on which the particles are transported is orientated essentially vertically rather than horizontally when the apparatus is used as intended, and the conveyor belt is arranged diagonally, i.e., at an angle to the horizontal plane, so as to move the particles along a direction that is slanted upwardly. By choosing an essentially vertical orientation for the transport surface, the particles can be fed to the conveyor belt in a much simpler manner than in the prior art. In particular, a feeding belt, as it has been proposed in the prior art for accelerating the particles before they are aspirated to the conveyor belt, can be dispensed with. Furthermore, recycling of particles that have not been properly aspirated to the conveyor belt can be accomplished in a much simpler manner. In particular, since the conveyor belt moves the particles upwardly at an incline, it is possible to transport particles that have fallen down from the conveyor belt back to the feeding zone purely by the action of gravity. In addition, the essentially vertical orientation of the transport surface enables a straightforward spatial separation between components that directly interact with the particles, such as the feeding device or components for sorting the particles, and components that do not need to be in immediate vicinity to the particles, such as a drive motor for the conveyor belt or electronic circuitry. The transport surface is considered to extend in an essentially vertical plane if the angle between the surface normal of the transport surface and the horizontal plane (defined as being perpendicular to the direction of gravity) is between −30° and +30°, preferably between −10° and +10°, and most preferred between −5° and +5°.

In order to accomplish recycling of particles that have dropped from the conveyor belt outside of the feeding zone, the apparatus may comprise an inclined recycling tray arranged below the transport surface, to collect particles that have dropped from the conveyor belt (from the transport surface) outside of the feeding zone and to recycle said particles to the feeding zone by the action of gravity. The recycling tray may define one or more inclined sliding surfaces on which the collected particles can slide downwards towards the feeding zone. In particular, the recycling may take the form of a downwardly sloping chute that is upwardly open to receive the particles that have dropped from the conveyor belt. No actuators such as a pump or belt are required to recycle the particles.

In order to accomplish a particularly simple feeding operation, the feeding device may comprise a feeding chamber that delimits the feeding zone and that has a sidewall portion formed by the conveyor belt. In other words, the feeding chamber may be partially delimited laterally, i.e., to one of its sides, by the conveyor belt. Such an arrangement is only possible since the conveyor belt is orientated vertically. The feeding chamber may taper downwardly towards the conveyor belt in order to minimize the dead volume of the feeding chamber.

In order to improve separation between components that are involved in the processing of the particles and which should therefore be in immediate proximity to the transport surface, and components that may be arranged remotely from the transport surface, the apparatus may comprise a vertical separating wall that defines a first side and a second side, the separating wall defining an elongate opening, the transport surface being arranged in said elongate opening so as to point towards the first side of the separating wall. The separating wall thus forms a screen between two distinct zones of the apparatus. The first zone on the first side of the separating wall is a "processing zone" in which the particles are transported and processed, e.g., in the case where the apparatus forms a sorting apparatus, during measurement and sorting. This zone may be exposed to heavy dust originating from the particles. The second zone is a "clean zone" that should be protected from dust. The conveyor belt and its drive components are generally arranged in the second zone ("clean zone"); however, the elongate opening in the separating wall provides access from the first zone ("processing zone") to that portion of the conveyor belt that acts as the moving transport surface for the particles. Further openings may be present for providing connections between the first and second zones for energy, data and media transfer. In particular, if the apparatus is configured as a sorting apparatus, comprising a measurement device with a light source and a light detector, at least one of said light source and said light detector is preferably arranged on the second side of the separating wall, in the "clean zone". On the other hand, if the apparatus comprises receptacles for receiving the particles after transport and/or sorting, said receptacles will advantageously be arranged on the first side of the separating wall, in the "processing zone". The apparatus may comprise a housing for closing off the first and/or second zone.

In a second aspect, the present invention provides a transport apparatus comprising:
- an endless conveyor belt having a plurality of perforations along its length, the conveyor belt being configured to transport the particles along a transport direction while they are aspirated to said perforations, thereby defining a movable transport surface;
- an elongate vacuum box extending along the transport direction, the vacuum box being open along one longitudinal side (not necessarily a lateral side) and being connectable to the source of negative pressure so as to apply a negative pressure to the vacuum box; and
- an elongate slider that covers said longitudinal side of the vacuum box, the slider having a plurality of suction openings, the suction openings defining a free cross section that varies along the transport direction, wherein the conveyor belt is slidably guided on said slider along the transport direction, so that a negative pressure at the perforations of the conveyor belt is caused by the negative pressure in the vacuum box and is modulated along the transport direction according to the free cross section defined by the suction openings of the slider.

In this manner, suction power of the conveyor belt can be easily modulated. The free cross section (effective cross section) is the percentage of the total cross sectional area of the suction openings in a certain region of the slider that is sufficiently large to contain a plurality of suction openings, relative to the total surface area of that region. If all suction openings have the same size and spacing along the length of the slider, the free cross section will be constant along the length of the slider. If all suction openings have the same spacing, but a cross-sectional area that increases or decreases along the length of the slider, the free cross section will also increase or decrease. If all suction openings have the same cross-sectional area, but a spacing that decreases or increases along the length of the slider, the free cross section will likewise vary. Of course, both size and spacing of the suction openings may be varied simultaneously to modulate the free cross section.

The variation of the free cross section of the suction openings (by varying size and/or spacing) along the transport direction preferably amounts to at least a factor of two, more preferably at least a factor of five. In other words, the slider has a first region along its length where the suction openings are more densely spaced and/or have a larger size than in a second region, the resulting free cross section in the first region being larger by at least a factor of two, more preferably by at least a factor of five, than in the second region. In this manner, a quite significant modulation of suction power can be achieved in a very simple fashion.

In order to create a smooth, continuous variation in suction power over the length of the slider, it is preferred that the slider defines a longitudinal groove that extends along the transport direction, the longitudinal groove creating a clearance space between the conveyor belt and the slider portion in which the suction openings are provided. The slider may comprise two parallel, longitudinal webs (i.e., longitudinal separating walls) that delimit the longitudinal groove, each web forming a contact surface for the conveyor belt. The clearance space enables limited pressure equalization over the length of the slider.

The transport device may comprise a feeding device for feeding particles to the conveyor belt in a feeding zone. It is then advantageous if the free cross section defined by the suction openings is larger in the feeding zone than downstream from the feeding zone along the transport direction, so as to provide an increased level of negative pressure (resulting in greater suction power) in the feeding zone.

The slider may be provided with a barrier member that is arranged on the slider to cover (and close) selected suction openings of the slider. The barrier member may be arranged in the above-mentioned longitudinal groove of the slider. In this manner the negative pressure at the perforations of the conveyor belt can be selectively reduced in a region where it is desired that the particles drop from the conveyor belt. For instance, if the apparatus is configured as a sorting device, it may be desired to cause the particles to drop from the conveyor belt at the end of a sorting zone.

The second aspect of the present invention can be readily combined with the first aspect of the present invention, i.e., the vacuum box and slider according to the second aspect of the present invention can be readily employed in an apparatus with vertical transport surface and inclined transport direction according to the first aspect of the present invention.

Transport and sorting can be parallelized by employing a plurality of conveyor belts. To this end, the apparatus may comprise one or more further endless conveyor belts, all conveyor belts being arranged in parallel with one another and stacked on top of each other with respect to the vertical direction. Each conveyor belt defines a movable transport surface for transporting the particles along the transport direction. The transport surfaces are preferably essentially co-planar with one another. In this manner, simultaneous transport, analysis and sorting of the particles on a plurality of parallel conveyor belts becomes possible. The plural conveyor belts can be driven by a common drive motor.

The apparatus may be complemented with further components to form a sorting apparatus for sorting the particles into a plurality of quality classes. To this end, the apparatus may comprise one or more of the following:

- at least one measurement device for determining at least one analytical property of the particles, the measurement device being arranged downstream from the feeding zone with respect to the transport direction; and
- a sorting device operatively coupled to said measurement device for sorting the particles into at least two quality classes based on said analytical property, the sorting device being arranged downstream from the measurement device with respect to the transport direction.

The measurement device may include one or more spectrometers, imaging spectrometers, cameras, mass spectrometers, acoustic-tunable filters, etc. to analyze particles like grains, beans, or seeds with respect to their analytical properties. The present apparatus may be able to assess one or several analytical properties simultaneously by measuring spectral properties (i.e., in the case of an optical spectrometer, the dependence of certain optical properties like reflectance or transmission on wavelength) of the particles under investigation. In addition or as an alternative, the measurement device may comprise a plurality of detectors configured to determine different analytical properties.

In preferred embodiments, analysis of the particles is carried out by optical means, and the measurement device comprises at least one light source and at least one light detector. The term "light" is to be understood to encompass all kinds of electromagnetic radiation from the far infrared (IR) region to the extreme ultraviolet (UV) or even to the X-ray region of the electromagnetic spectrum. The light source and light detector may be arranged on different sides of the transport surface, so as to shine light through the perforations, and the light detector may then be arranged to receive light transmitted through particles moved past the measurement device on said transport surface. In other embodiments, the light source and light detector may be arranged on the same side of the transport surface (preferably on that side on which the particles are transported), the light detector being arranged to receive light reflected from particles moved past the measurement device on the transport surface. For increasing the throughput of the apparatus, the measurement device may comprise a plurality of light detectors arranged along a transverse direction extending transverse to the transport direction, so as to enable simultaneous measurements of the analytical properties of particles moving past the measurement device in different transverse locations.

The light detector may comprise at least one spectrometer configured to record spectra of light received from particles moving past the measurement device. These spectra may then be analyzed to derive analytical properties from the spectra. In some embodiments, the light detector may comprise an imaging spectrometer configured to record spatially resolved spectra of particles moving past the measurement device in different transverse locations. In this manner, not only spectral properties of these particles may be analyzed, but also geometric properties such as size or shape may be derived. In other embodiments, the light detector may comprise a camera, in particular, a line-scan camera or a camera having a two-dimensional image sensor. This allows analyzing size and/or shape and/or color and/or fluorescence independently of other properties.

The measurement device may include a processing device for assigning each single particle to one of the quality classes for subsequent sorting, based on one or more measured variables. The processing device may this control the sorting device. The processing device may comprise a computer that executes a prediction and classification algorithm. If the measurement device includes a spectrometer, the measured variables received from the spectrometer by the processing device may include spectral data. If the measurement device includes one or more cameras, the measured variables received from the cameras by the processing device may include image data.

Sorting may be carried out in a variety of different ways, including pneumatic, piezoelectric, mechanical, gravity and other types of sorters. For example, the sorting device may comprise at least one pneumatic ejection nozzle operatively coupled to said measurement device to generate an air jet for selectively blowing particles moving past said ejection nozzle away from the transport surface. The ejection nozzle can be positioned at that side of the transport surface that is opposite to the side on which the particles are transported, so as to generate an air jet through said perforations. In other embodiments, the ejection nozzle can generate an air stream that is parallel to the transport surface and transverse to the transport direction to blow the particles away from the transport surface in a lateral direction.

Types of particles that can be transported and sorted with such an apparatus include, without being limited thereto, agricultural particles such as grains, beans, seeds or kernels of cereals like wheat, barley, oat, rice, corn, or sorghum; soybean, cocoa beans, and coffee beans, and many more. Types of analytical properties that can be assessed are, without being limited thereto, chemical or biochemical properties, the degree of contamination with contaminating agents and/or infective agents and/or other pathogen agents, and/or geometric and sensorial properties such as size, shape, and color. In particular, biochemical properties shall be understood to be properties that reflect the structure, the composition, and the chemical reactions of substances in living organisms. Biochemical properties include, without being limited thereto, protein content, oil content, sugar content, and/or amino acid content, moisture content, polysaccharide content, in particular, starch content or gluten content, fat or oil content, antioxidant content, vitamin content, or content in specific biochemical or chemical markers, e.g., markers of chemical degradation, as they are generally known in the art. Contaminating or infecting agents include harmful chemicals and microorganisms, which can cause consumer illness and include, without being limited thereto, fungicides, herbicides, insecticides, pathogen agents, bacteria and fungi.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
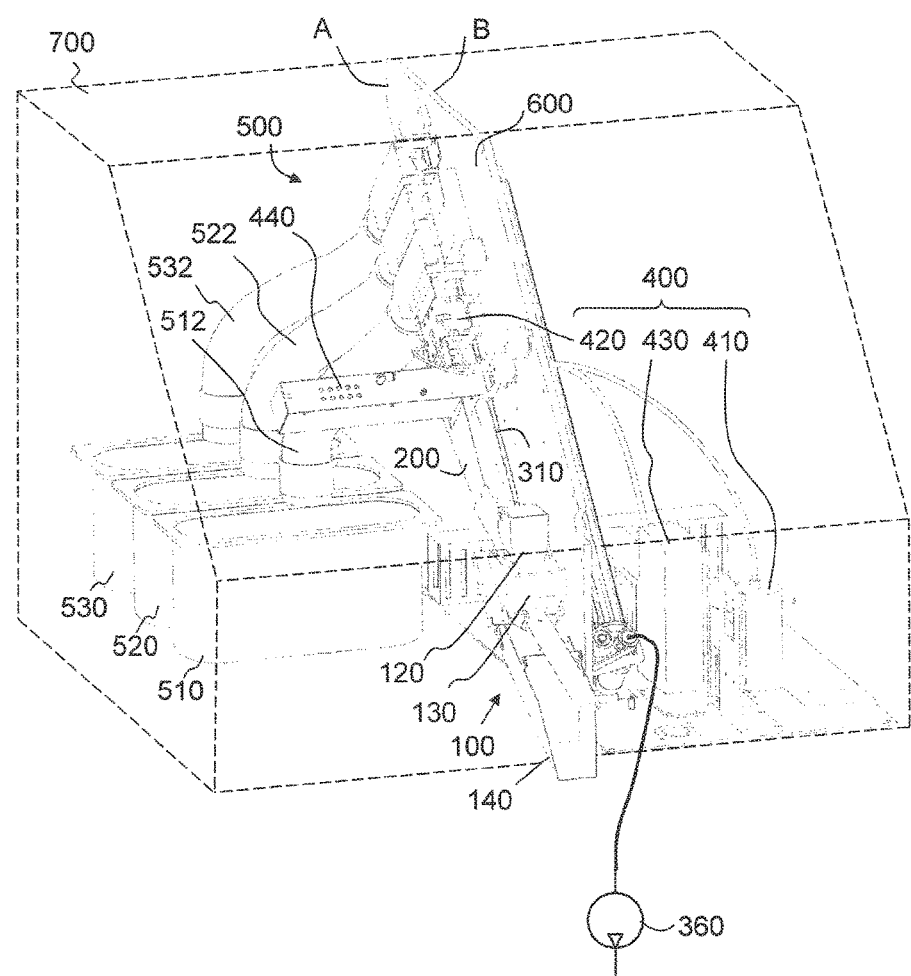
FIG. 1 shows a first embodiment of a sorting apparatus.
Figure 2:
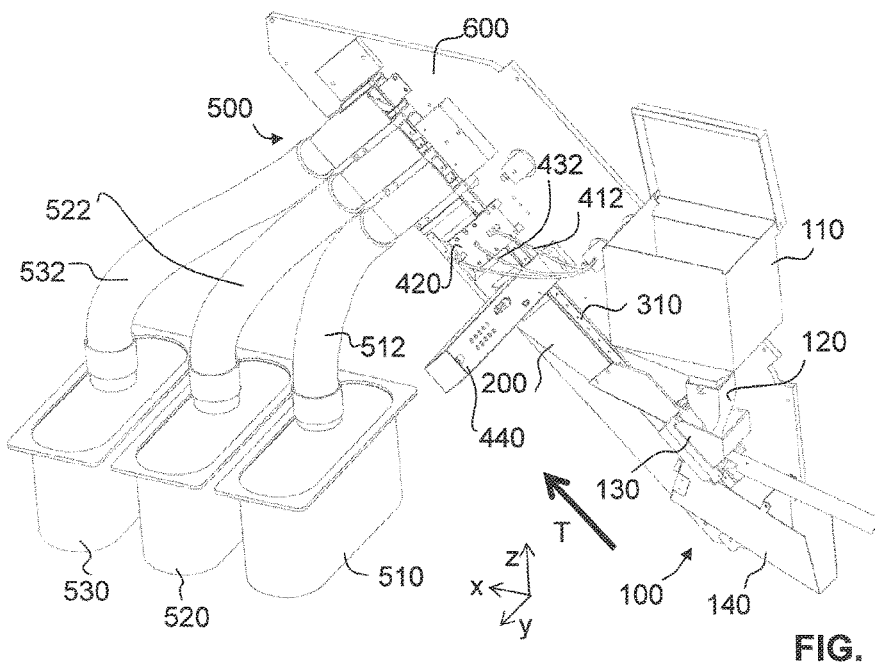
FIG. 2 shows part of the sorting apparatus in FIG. 1 in an isometric view.
Figure 3:
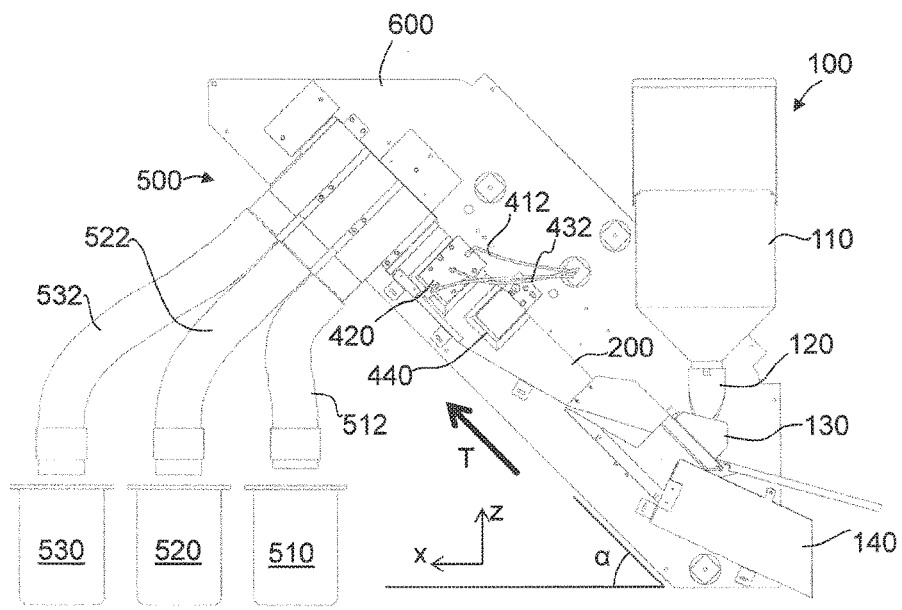
FIG. 3 shows part of the sorting apparatus in FIG. 1 in a front view.

A first embodiment of a sorting apparatus employing a transport mechanism according to the present invention is illustrated in FIGS. 1 to 11. Reference is first made to FIGS. 1-3, which show various parts of the sorting apparatus in different views.

The sorting apparatus comprises a transport device that includes a vacuum conveyor belt 310. The conveyor belt 310 has a portion that serves to transport particles from a feeding device 100 to a sorting device 500 along a transport direction T (see FIGS. 2 and 3). This portion defines a transport surface. The transport surface is orientated vertically, i.e., the transport surface extends in a vertical plane x-z. As best seen in FIG. 3, the transport direction T is inclined at an angle α relative to the horizontal plane (x-y plane). In the present example, the angle α is approximately 45°.

The feeding device 100 feeds particles to the conveyor belt 310. It comprises a hopper 110 (shown only in FIGS. 2 and 3), into which the particles to be sorted are filled in bulk form. From there, the particles pass through a funnel 120 into a feeding chamber 130. The feeding chamber 130 is delimited to one lateral side by the moving conveyor belt 310. Particles can be removed from the feeding chamber 130 with the aid of an outlet chute 140.

Figure 4:
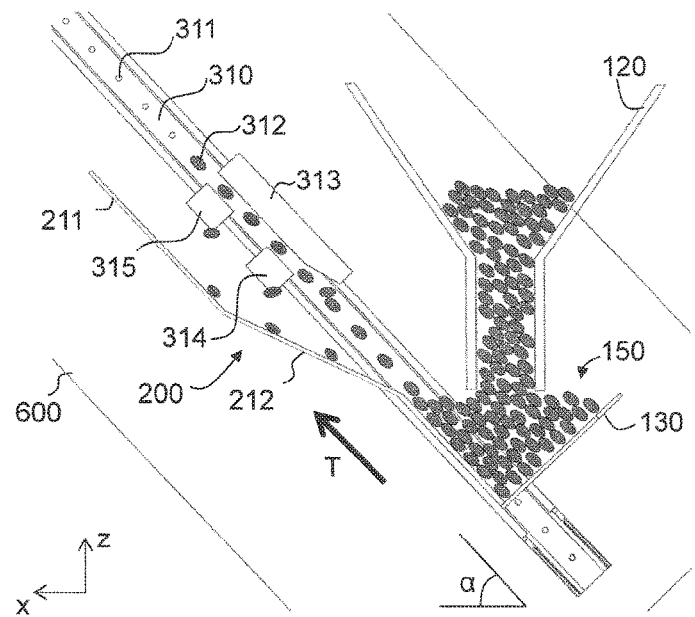
FIG. 4 is a schematic drawing illustrating the manner in which particles are fed and recycled.
Figure 5:
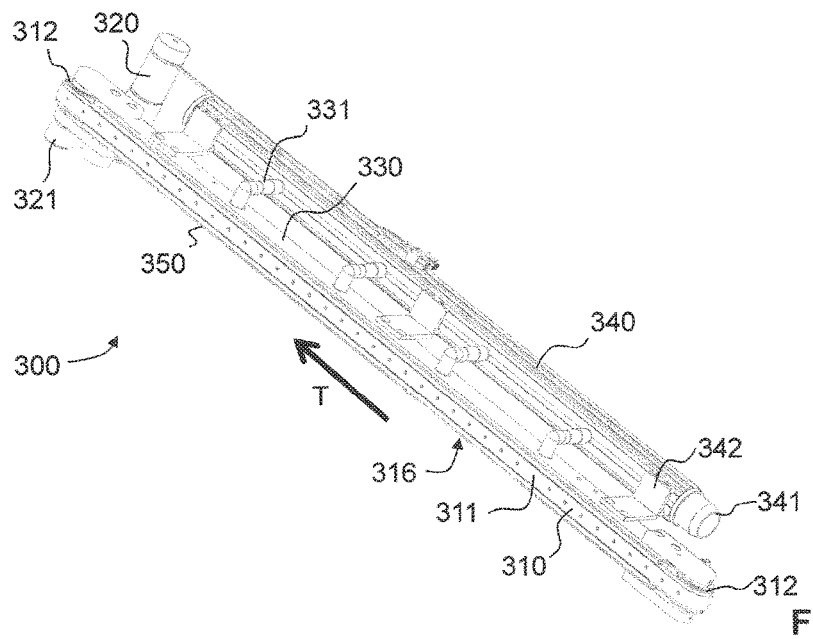
FIG. 5 shows the transport unit of the sorting apparatus in FIG. 1.
Figure 6:
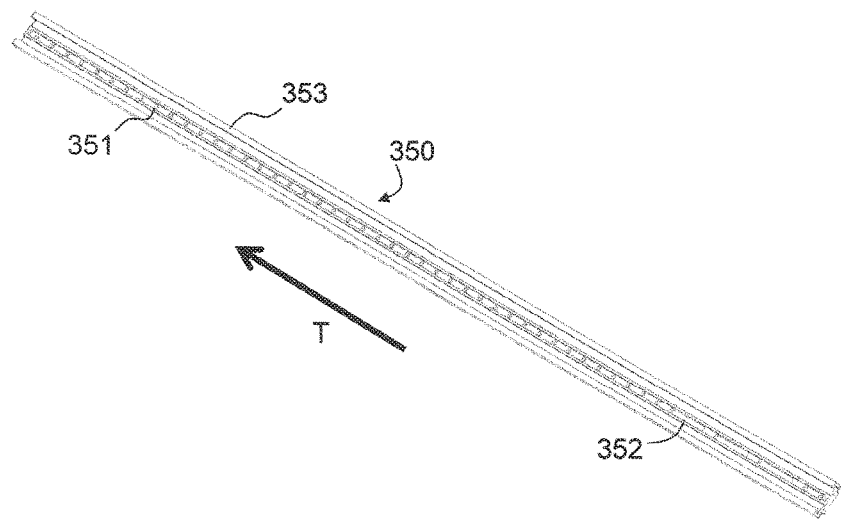
FIG. 6 shows a slider used in conjunction with the transport unit in FIG. 5.

As apparent from the schematic drawing of FIG. 4, the conveyor belt 310 has a plurality of perforations (through-holes) 311 arranged at regular intervals along the length of the belt (i.e., along the transport direction T). As will be explained in more detail below, a negative pressure (vacuum) is applied to the perforations 311. Particles 312 that enter the feeding chamber 130 reach the conveyor belt 310 in a feeding zone 150 and are aspirated (sucked) to the perforations 311 by action of the negative pressure. The aspirated particles are transported by the conveyor belt along the transport direction T. The particles will thus be transported in well-defined locations defined by the perforations, these perforations generally being smaller than the smallest dimension of the particles so as to avoid that particles pass through the perforations.

Ideally, exactly one particle is aspirated to each perforation. However, it may happen that a second particle sticks to the same perforation as another particle. Such excess particles are stripped from the conveyor belt 310 by skimmers 313, 314, 315, which allow only one particle at a time to pass. Each skimmer may include, e.g., a solid block of material, a sponge, a brush, a thin blade, a nozzle creating a sharply delimited air stream ("air blade"), etc. In addition, the skimmers may be configured to force those particles that remain attached to the conveyor belt to take a predetermined orientation. In particular, the particles may have a generally ellipsoid shape with a long axis, as it is the case for many cereal grains. In this case, the skimmers may be configured to cause the particles to take an orientation in which their long axis is generally parallel to the transport direction T. To this end, the skimmers may have a lateral distance (a distance perpendicular to the transport direction) that is adjustable, so as to be able to adjust the distance to be less than the typical length of the long axis of the particles, but more than the typical length of the short axis. At least one of the skimmers (here, skimmer 313) may have a guiding surface that is inclined relative to the transport direction for guiding the particles into their desired orientation.

The particles that have been stripped by the skimmers as well as particles that have fallen from the belt for other reasons are collected by a recycling tray 200 in the form of an upwardly open, inclined chute. The recycling tray 200 is inclined to the horizontal. With its lower end, the recycling tray opens out into the feeding zone (i.e., into feeding chamber 130). In the present example, the recycling tray 200 defines two differently inclined, adjacent sliding surfaces 211, 212 on which the particles can slide downwards. Particles that enter the recycling tray thus slide down the recycling tray by the action of gravity and re-enter the feeding zone without any active actuation.

Referring again to FIGS. 1-3, the conveyor belt 310 transports those particles that remain aspirated to its perforations past a video camera 440 and an illumination box 420. The illumination box 420 and video camera 440 are part of a measurement device 400, which further comprises one or more NIR light sources 410, as known per se, and an NIR spectrometer 430, as it is also known per se. Optical fibers 411, 431 guide the light that is emitted by the NIR light source(s) 410 to the illumination box 420, and carry the light that is reflected from the particles back to the NIR spectrometer 430. In order to increase the amount of signal detected, the illumination box 420 can contain focusing, imaging or guiding systems, such as e.g. lenses, mirrors, collimators, optical fibers or combinations of these elements, for concentrating the source radiation onto the particles and for collecting the signal emitted, reflected, scattered, or transmitted by the particles toward the spectrometer. Such elements are not shown in the drawing since they are well known in the related optical art. In the present example, the light for illuminating the particles is guided by one or more optical fibers ("cold light source"). In other embodiments, it is conceivable that the particles are illuminated without the use of optical fibers ("direct illumination"). The NIR spectrometer 430 records NIR spectra of the reflected light. These spectra are analyzed by a processing device comprising computer, which may be included in the same housing as spectrometer 430 or in a different housing (even in a different location), and which may conceptually be considered to be part of the measurement device. Optionally, the processing device may also receive the images recorded by the video camera 440, and the analysis may additionally take these images into account. As a result of the analysis, the processing device determines the quality class to which each of the particles belongs, and sends associated control signals to the sorting device 500.

Instead of an NIR light source and an NIR spectrometer, other measurement means can be employed. In more general terms, the measurement device 400 may include one or more spectrometers, imaging spectrometers, cameras, mass spectrometers, acoustic-tunable filters, etc. to analyze particles like grains, beans, or seeds with respect to their analytical properties. The present apparatus may be able to assess one or several analytical properties simultaneously by measuring spectral properties (i.e., the dependence of certain optical properties like reflectance or transmission on wavelength) of the particles under investigation.

After having passed the measurement device 400, the particles reach the sorting device 500. The sorting device 500 is operatively coupled to the measurement device 400, receiving control signals from the measurement device 400. In the present example, the sorting device 500 sorts the particles into three quality classes. For each quality class, a receptacle 510, 520 and 530, respectively, is provided. Tubular ducts 512, 522 and 532 connect the sorting device to the receptacles. The sorting device will be explained in more detail further below in conjunction with FIG. 11.

FIGS. 5-8 illustrate the transport device 300 in more detail. The conveyor belt 310 is deflected at both ends by deflection pulleys 312. It is driven by a drive motor 320 via a drive belt 321. Between the deflection pulleys 312, a vacuum box 330 is arranged. The vacuum box 330 is laterally open at one of its longitudinal sides, towards that portion of the conveyor belt 310 that forms the transport surface 316. The vacuum box is connected via a plurality of vacuum pipes 331 to a manifold 340, which takes the form of a hollow elongate cylinder. At one of its ends, the manifold has a vacuum connector 341 for connecting a vacuum pump 360 (illustrated only in a highly schematic manner in FIG. 1). A slider 350, which is shown by itself in FIGS. 6-8, covers the laterally open side of the vacuum box 330. The conveyor belt 310 is guided on the slider 350 by means of a pair of guiding rails 353, which grasp the belt on both sides. The slider comprises a plurality of suction openings 351, 352. In the present example, two different sizes of suction openings exist: small round holes 351 and larger elongate holes 352 whose long axis extends along the transport direction and which have a larger cross section than the small holes 351. The holes are distributed at roughly regular intervals along the transport direction (i.e., along the length of the slider).

Figure 7:
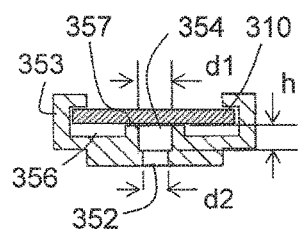
FIG. 7 shows an enlarged cross section through the slider in FIG. 6 in plane VII-VII of FIG. 8, together with the conveyor belt.

As best visible in the cross section of FIG. 7, a longitudinal groove 354 of width d1 is arranged between the conveyor belt 310 and that wall portion of the slider in which the suction openings (having a width d2) are disposed. The longitudinal groove 354 is delimited to both sides by longitudinal webs 357, which form contact surfaces for the underside of the conveyor belt 310. The longitudinal groove 354 extends along the entire length of the slider 350 (or at least along a length that encompasses a plurality of openings) and has a height h. The longitudinal groove 354 thus leaves a clearance h between the conveyor belt 310 and the suction openings 351, 352. The cross-sectional area (amounting to the product h*d1) of the longitudinal groove 354 with respect to the longitudinal direction is sufficiently large to allow for some degree of local pressure equalization along the length of the groove, but is too small to allow for global pressure equalization over the entire length of the slider, when a negative pressure is applied to the vacuum box 330. In this manner, the amount of negative pressure that is experienced by the underside of the conveyor belt 310 (and thus by the perforations 311 of the conveyor belt) smoothly varies along the length of the slider 350 according to the cross section of the suction openings of the slider: Portions of the belt that are proximate the larger openings 312 experience a higher amount of negative pressure (a higher suction power) than portions that are proximate the smaller openings 311.

The portion of the slider that contains the larger openings 312 will advantageously be arranged in the feeding zone 350 so as to provide increased suction power in that zone.

In the present example, typical dimensions of the longitudinal groove 354 may be chosen as follows: d1=4 mm, h=3 mm, resulting in a cross-sectional area of the groove 354 of 12 mm$^2$. The size of the holes may be chosen as follows: diameter of the small holes d1=3 mm (cross section approximately 7 mm$^2$), width of the long holes 4 mm, length of the long holes 30 mm (cross section approximately 120 mm$^2$). Of course, different dimensions may be chosen according to need.

Further longitudinal grooves 356 to both sides of the webs 357 reduce the width of the contact surfaces in order to minimize friction between the underside of the belt and the slider. The guide rails 353 have a hook-shaped cross section to retain the belt on the slider.

Figure 8:
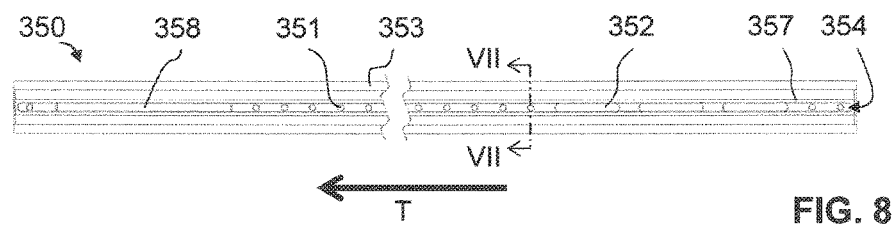
FIG. 8 shows an enlarged view of the proximal and distal end portions of the slider in FIG. 6, with a barrier member placed over some suction openings.

As illustrated in FIG. 8, some of the suction openings may be covered by a barrier member 358 in the form of a elongate cuboid, which partially or fully fills out the longitudinal groove 354 and thus blocks the corresponding holes. In this manner, suction power can be minimized for those portions of the conveyor belt 310 where no suction is desired, in particular, at the end of the sorting device 350.

If the conveyor belt has more than one row of perforations, e.g., two or more parallel rows extending along the transport direction, the design of the slider can be readily adapted to the number of rows of perforations. In particular, one or more additional rows of suction openings can be provided along the length of the slider in parallel to the first row. A longitudinal groove can then be arranged between the conveyor belt and each wall portion of the slider in which the suction openings are disposed. Each longitudinal groove can be delimited by longitudinal webs.

Reverting to FIG. 1, a vertical separating wall 600 separates two different zones of the sorting apparatus. A first zone, which may be called a processing zone, is arranged on a first side A of the separating wall 600. Transport and processing of the particles is carried out in this zone. In particular, the feeding device 100, the recycling tray 200, the video camera 440, the illumination box 420, and the sorting device 500 are arranged in this zone. A second zone, which may be called a clean zone, is arranged on a second side B of the separating wall 600. In this zone, delicate components, which should be kept away from dust and dirt, are arranged, including the NIR light source 410, the spectrometer 430, the drive components for the transport device 300, etc. The separating wall acts as a screen for dust and dirt between the first zone and the second zone. The sorting device further comprises a housing 700 (illustrated only in a highly schematic manner in dashed lines), which delimits these zones towards the environment, thus creating two essentially closed spaces that are well isolated from one another. The housing may of course have access openings to provide access to the receptacles 510, 520, 530 and to other components of the device, which access openings may be closed by appropriate means like doors or removable covers.

Figure 9:
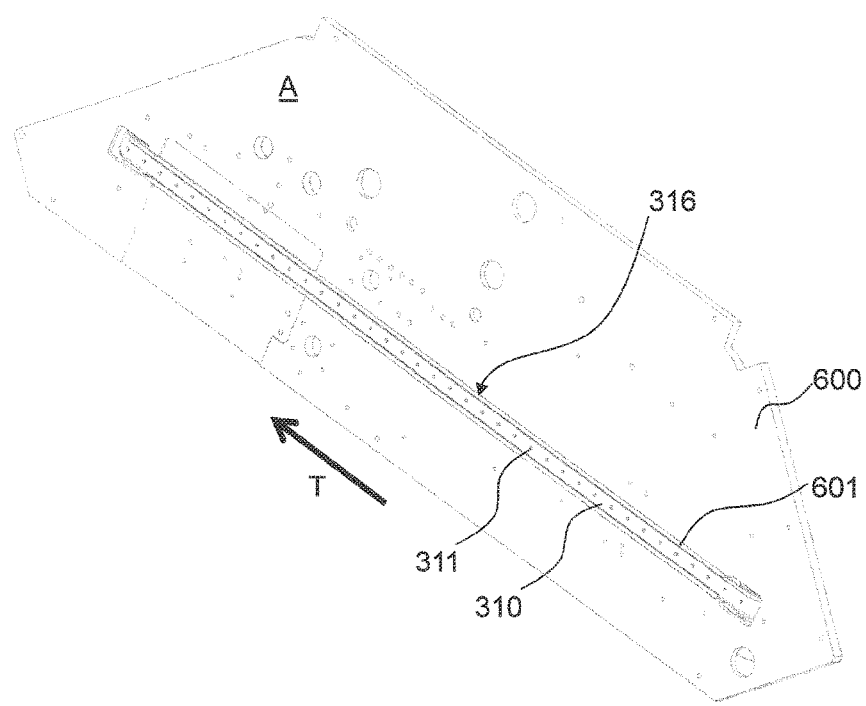
FIGS. 9-10 show the transport unit in FIG. 5 together with a separating wall.
Figure 10:
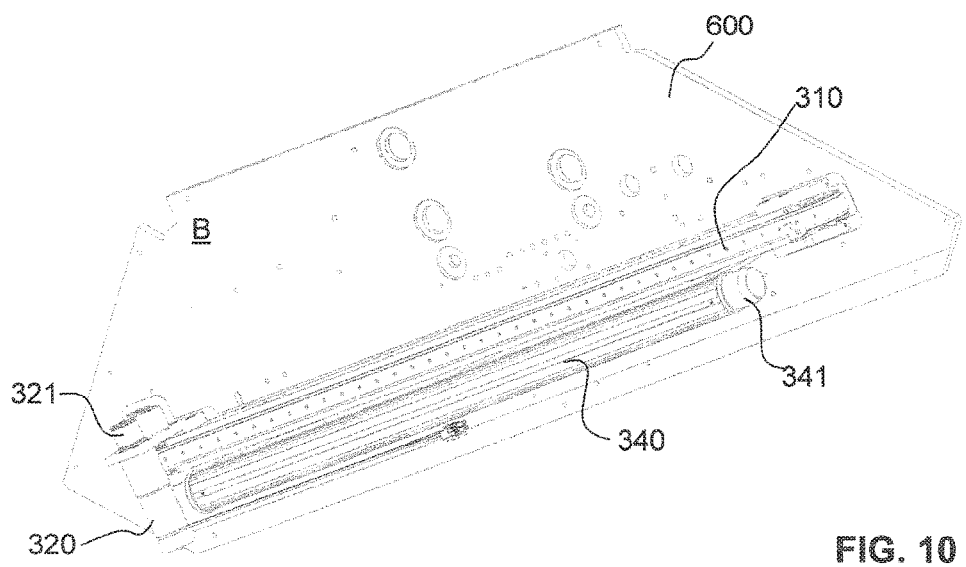

FIGS. 9 and 10 illustrate how the conveyor belt 310 is arranged in an elongate opening 601 of the separating wall 600 to provide access to the transport surface 316 from the first side A, whereas the remainder of the transport device, including the deflection pulleys, the drive motor 320, the drive belt 321, the manifold 340 etc., are arranged on the second side B of the separating wall 600.

Sorting may be carried out in a variety of different ways, including pneumatic, piezoelectric, mechanic and other types of sorters. For example, the sorting device 500 may comprise at least one pneumatic ejection nozzle (pressurized air nozzle) operatively coupled to said measurement device to generate an air jet for selectively blowing particles moving past said ejection nozzle away from the transport surface. The ejection nozzle can be positioned at that side of the transport surface that is opposite to the side on which the particles are transported, so as to generate an air jet through the perforations, or it can be positioned on the same side as the side on which the particles are transported, e.g., laterally from the conveyor belt so as to create an air stream across the transport surface.

Figure 11:
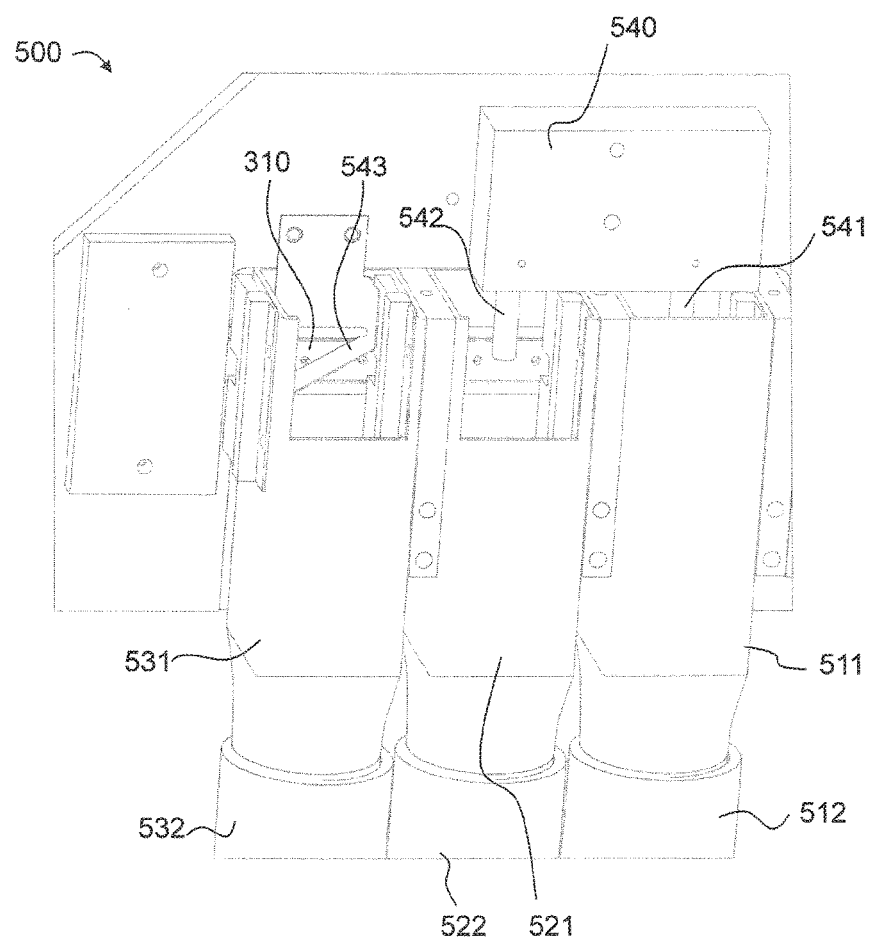
FIG. 11 shows a detail view of a sorting device.

FIG. 11 illustrates a preferred sorting device 500. Particles on the conveyor belt 310 enter the sorting device from the right. They first enter a first sorting box 511, which is connected via the first duct 512 to the first receptacle 510. If the particle has been identified by the measurement device 400 as belonging to a first quality class, a first pressurized air nozzle 541 connected to a distributor box 540 is actuated by means of a valve in the distributor box, blowing the particle away from the conveyor belt and down into the first duct 512, from where it reaches first receptacle 510. Otherwise, the particle will continue to be transported by the conveyor belt into a second sorting box 512. If the particle has been identified by the measurement device 400 as belonging to a second quality class, a second air nozzle 542 is actuated, blowing the particle away from the conveyor belt and down into the second duct 522, from where it reaches second receptacle 520. Otherwise, the particle will continue to be transported by the conveyor belt and will enter a third sorting box 513. The third sorting box 531 contains a deflector plate 543, which deflects all particles that enter this box downwards into the third duct 531, from where it reaches third receptacle 530. It is in the region of the third sorting box 531 where barrier member 354 (FIG. 8) is disposed on slider 350 to minimize suction power of the conveyor belt in this region.

It is of course possible to sort the particles into more or less than three quality classes by providing more or less air nozzles. Instead of pressurized air nozzles, any other means for selectively removing particles from the conveyor belt may be used, such as piezoelectric devices, magnetic devices, moving flaps or any other means that can be activated and controlled by the measurement device.

In alternative embodiments, the perforations of the conveyor belt can be arranged in a plurality of parallel rows extending in the transport direction. In this manner, it is possible to move a plurality of particles past the measurement device simultaneously in well-defined locations. The lateral distance between the rows is preferably somewhat larger than the (average) largest dimension of the particles so as to avoid overlap of particles. The perforations of adjacent rows may be arranged in the same position along the transport direction, such that the perforations form a rectangular grid on the transport surface, or they may be arranged in different positions along the transport direction, such that the perforations form an oblique grid or even an irregular arrangement.

Figure 12:
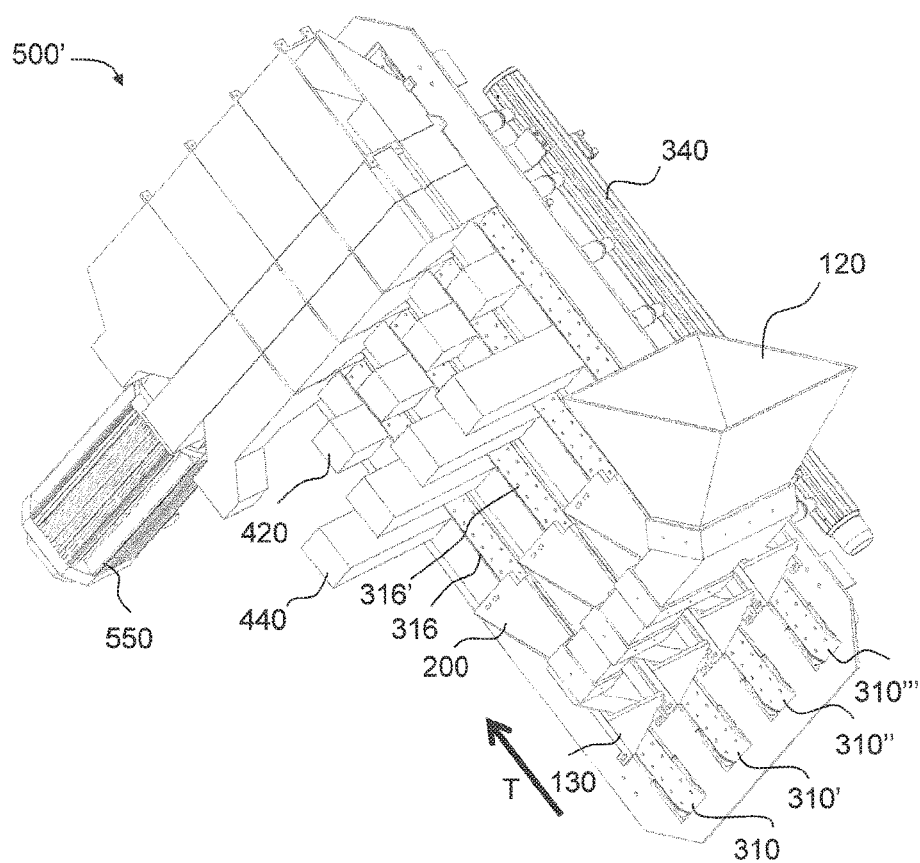
FIG. 12 shows a second embodiment of a sorting apparatus.

In addition or in the alternative, it is possible to arrange a plurality of parallel conveyor belts side-by-side. FIG. 12 illustrates such an embodiment, in which a plurality of parallel conveyor belts 310, 310', 310'', 310''' are employed. All conveyor belts are arranged in parallel configuration, and their respective transport surfaces 316, 316' etc. are all co-planar. The belts are all driven by a common drive motor 550. Each conveyor belt defines two parallel longitudinal rows of perforations. In this manner, particles can be simultaneously transported, analyzed and sorted in eight parallel rows. The particles are fed to the four conveyor belts by a common feeding device, for which an example is illustrated in more detail in FIG. 14. Each conveyor belt is associated with a recycling tray 200 arranged immediately below the corresponding conveyor belt. Each recycling tray is designed as described above in conjunction with the first embodiment. Each conveyor belt has associated therewith one individual video camera 440 and one individual illumination box 420. A common sorting device 500' acts to sort the particles into quality classes, based on the same principles as explained in conjunction with the first embodiment.

Figure 13:
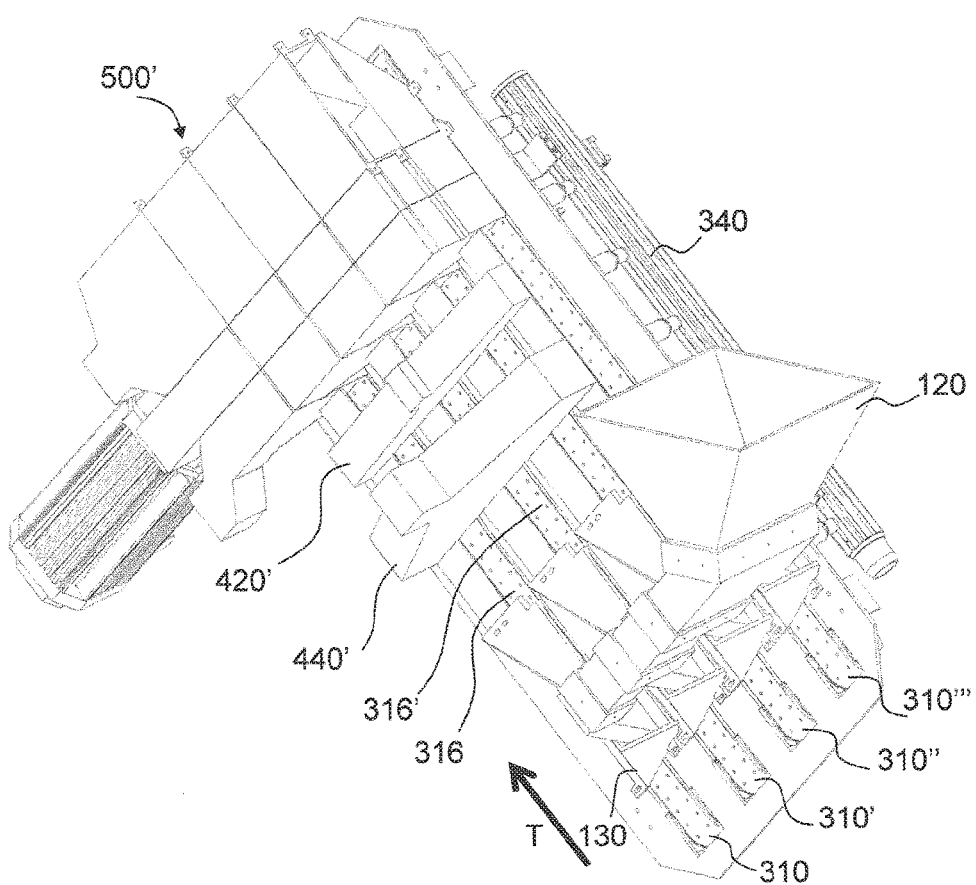
FIG. 13 shows a third embodiment of a sorting apparatus.

FIG. 13 illustrates an alternative, third embodiment with a plurality of parallel conveyor belts. In this embodiment, a common camera unit 440' and a common illumination box 420' are provided for all conveyor belts.

Figure 14:
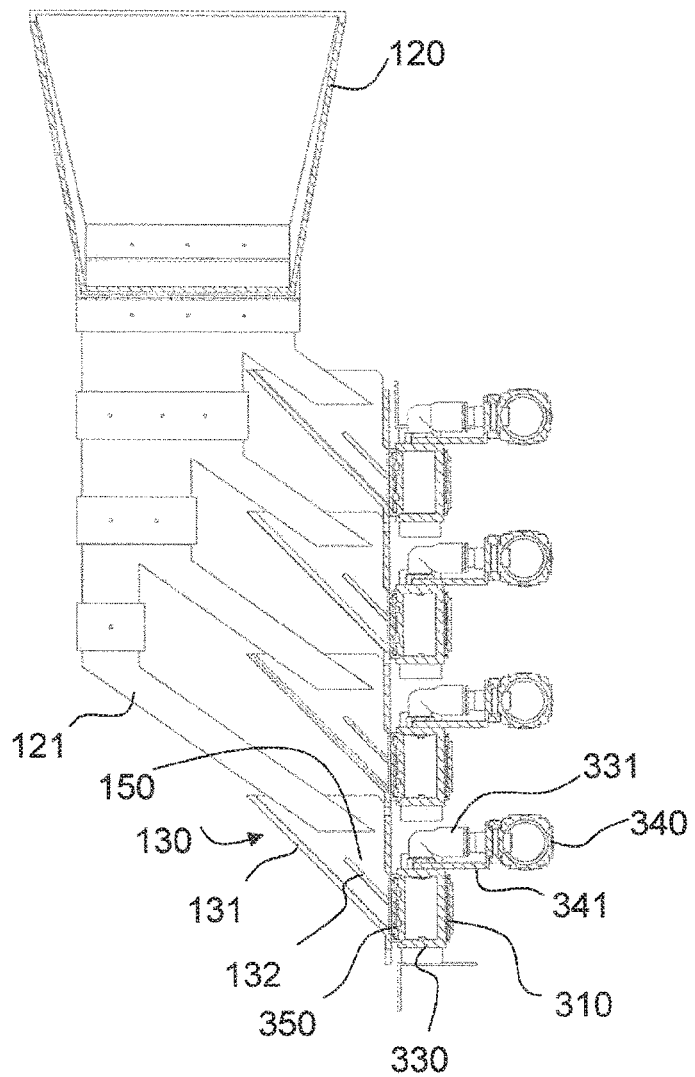
FIG. 14 shows a feeding device for the second and third embodiments.

FIG. 14 illustrates a feeding device that can be employed with the second or third embodiment. Particles are fed from a common funnel 120 into a plurality of ducts 121. Each duct ends at one feeding chamber 130, which is delimited to one side by one of the conveyor belts. A separation plate, which is inclined downwardly towards the respective conveyor belt and extends in parallel to an outer wall 131 of the feeding chamber 130, separates particles that are to be aspirated to the upper row of perforations of each conveyor belt from particles that are to be aspirated to the lower row.

Of course a large number of modifications are possible without departing from the scope of the present invention. In particular, a different number of rows of perforations than one or two can be present in the conveyor belt. More or less than four conveyor belts can be arranged in parallel. The transport direction defined by the conveyor belt(s) can have a different inclination to the horizontal than in the above examples. Different kinds of measurement device, based on different detection principles, may be employed, as long as the measurement device enables a distinction between quality classes. For additional considerations with respect to the measurement device, reference is made to WO 2012/145850 A1, whose contents are incorporated herein by reference in their entirety.

The invention claimed is:

1. An apparatus for transporting particles, the apparatus comprising:
   an endless conveyor belt having a plurality of perforations along a length of the conveyor belt, the apparatus being configured to enable application of a negative pressure to said perforations so as to aspirate the particles to said perforations, the conveyor belt being configured to transport the particles along a transport direction while the particles are aspirated to said perforations, thereby defining a movable transport surface, the movable transport surface extending in an essentially vertical plane, and the transport direction being inclined upwardly relative to a horizontal direction;

a feeding device structured to feed the particles to the conveyor belt in a feeding zone along a feeding direction, the feeding direction extending essentially perpendicularly to a surface normal of the movable transport surface; and an inclined recycling tray that is arranged below the movable surface to collect particles that have dropped from the conveyor belt outside of the feeding zone and to recycle said particles to the feeding zone by the action of gravity.

2. The apparatus of claim 1, wherein the feeding device comprises a feeding chamber that has a sidewall portion formed by the conveyor belt.

3. The apparatus of claim 1, further comprising a vertical separating wall that defines a first side and a second side, the separating wall defining an elongate opening, the movable transport surface being arranged in said elongate opening so as to point towards the first side of the separating wall.

4. The apparatus of claim 3, further comprising a drive motor for driving the conveyor belt, the drive motor being arranged on the second side of the separating wall.

5. The apparatus of claim 1, further comprising a source of negative pressure for applying a negative pressure to the perforations of the conveyor belt.

6. The apparatus of claim 1, further comprising:
an elongate vacuum box extending along the transport direction, the vacuum box being open along one longitudinal side and being connectable to a source of negative pressure so as to apply a negative pressure to the vacuum box; and
an elongate slider that covers said longitudinal side of the vacuum box, the slider being provided with a plurality of suction openings, the suction openings defining a free cross section that varies along the transport direction,
wherein the conveyor belt is slidably guided on said slider along the transport direction, so that the negative pressure in the vacuum box causes a negative pressure at said perforations of the conveyor belt, the negative pressure at the perforations being modulated along the transport direction according to the free cross section defined by the suction openings of the slider.

7. An apparatus for transporting particles, comprising:
an endless conveyor belt having a plurality of perforations along a length, the conveyor belt being configured to transport the particles along a transport direction while the particles are aspirated to said perforations;
an elongate vacuum box extending along the transport direction, the vacuum box being open along one longitudinal side and being connectable to a source of negative pressure so as to apply a negative pressure to the vacuum box; and
an elongate slider that covers said longitudinal side of the vacuum box, the slider being provided with a plurality of suction openings, the suction openings defining a free cross section that varies along the transport direction,
wherein the conveyor belt is slidably guided on said slider along the transport direction, so that the negative pressure in the vacuum box causes a negative pressure at said perforations of the conveyor belt, the negative pressure at the perforations being modulated along the transport direction according to the free cross section defined by the suction openings of the slider, and
wherein the slider defines a longitudinal groove that extends along the transport direction, the longitudinal groove creating a clearance space between the conveyor belt and a slider portion in which the suction openings are provided.

8. The apparatus of claim 7, further comprising a barrier member that is arranged on the slider to cover selected suction openings of the slider.

9. The apparatus of claim 7, further comprising a feeding device for feeding particles to the conveyor belt in a feeding zone, wherein the free cross section defined by the suction openings is larger in the feeding zone than downstream from the feeding zone along the transport direction.

10. The apparatus of claim 1, further comprising:
at least one measurement device for determining at least one analytical property of the particles, the measurement device being arranged downstream from the feeding zone with respect to the transport direction; and
a sorting device operatively coupled to said measurement device for sorting the particles into at least two quality classes based on said analytical property, the sorting device being arranged downstream from the measurement device with respect to the transport direction.

11. The apparatus of claim 1, comprising a plurality of endless conveyor belts, the conveyor belts being arranged parallel to one another, each conveyor belt defining a movable transport surface for transporting the particles along the transport direction, the movable transport surfaces being essentially co-planar with one another.

12. An apparatus for transporting particles, the apparatus comprising:
an endless conveyor belt having a plurality of perforations along a length of the conveyor belt, the apparatus being configured to enable application of a negative pressure to said perforations so as to aspirate the particles to said perforations, the conveyor belt being configured to transport the particles along a transport direction while the particles are aspirated to said perforations, thereby defining a movable transport surface, the movable transport surface extending in an essentially vertical plane, and the transport direction being inclined upwardly relative to a horizontal direction;
a feeding device structured to feed the particles to the conveyor belt in a feeding zone along a feeding direction, the feeding direction extending essentially perpendicularly to a surface normal of the movable transport surface,
an elongate vacuum box extending along the transport direction, the vacuum box being open along one longitudinal side and being connectable to a source of negative pressure so as to apply a negative pressure to the vacuum box; and
an elongate slider that covers said longitudinal side of the vacuum box, the slider being provided with a plurality of suction openings, the suction openings defining a free cross section that varies along the transport direction,
wherein the conveyor belt is slidably guided on said slider along the transport direction, so that the negative pressure in the vacuum box causes a negative pressure at said perforations of the conveyor belt, the negative pressure at the perforations being modulated along the transport direction according to the free cross section defined by the suction openings of the slider,
wherein the slider defines a longitudinal groove that extends along the transport direction, the longitudinal groove creating a clearance space between the conveyor belt and a slider portion in which the suction openings are provided.

13. The apparatus of claim 6, further comprising a barrier member that is arranged on the slider to cover selected suction openings of the slider.

14. The apparatus of claim 6, further comprising a feeding device for feeding particles to the conveyor belt in a feeding zone, wherein the free cross section defined by the suction openings is larger in the feeding zone than downstream from the feeding zone along the transport direction.

15. The apparatus of claim 9, further comprising:
   at least one measurement device for determining at least one analytical property of the particles, the measurement device being arranged downstream from the feeding zone with respect to the transport direction; and
   a sorting device operatively coupled to said measurement device for sorting the particles into at least two quality classes based on said analytical property, the sorting device being arranged downstream from the measurement device with respect to the transport direction.

* * * * *